United States Patent
Liu

(10) Patent No.: US 8,363,177 B2
(45) Date of Patent: Jan. 29, 2013

(54) LIQUID CRYSTAL DISPLAY WITH POINT ILLUMINATOR BONDED TO LIQUID CRYSTAL PANEL THEREOF

(75) Inventor: Xian-Jie Liu, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 720 days.

(21) Appl. No.: 12/221,995

(22) Filed: Aug. 8, 2008

(65) Prior Publication Data

US 2009/0040429 A1    Feb. 12, 2009

(30) Foreign Application Priority Data

Aug. 8, 2007    (CN) ...................... 2007 2 0121998 U

(51) Int. Cl.
*G02F 1/1333* (2006.01)
*G02F 1/1335* (2006.01)

(52) U.S. Cl. ................ 349/56; 349/58; 349/61; 349/65; 362/97.1; 362/97.4

(58) Field of Classification Search ................ 349/56, 349/58, 61, 65; 362/97.1–97.4
See application file for complete search history.

(56) References Cited

U.S. PATENT DOCUMENTS

| 6,961,103 | B2 | 11/2005 | Sung et al. | |
| 2007/0103616 | A1* | 5/2007 | Yu et al. | 349/58 |

* cited by examiner

*Primary Examiner* — Brian Healy
*Assistant Examiner* — Mary El Shammaa
(74) *Attorney, Agent, or Firm* — WPAT PC; Justin King

(57) ABSTRACT

An exemplary liquid crystal display includes a liquid crystal panel, a light guide plate, and a point illuminator. The liquid crystal panel includes a first substrate, a second substrate, and a liquid crystal layer disposed between the first and second substrates. The light guide plate is disposed on a side of the second substrate that is not in contact with the liquid crystal layer, and includes a light incident surface. The point illuminator is rigidly bonded to the side of the second substrate that is not in contact with the liquid crystal layer, and faces the light incident surface of the light guide plate, such that the position of the point illuminator is fixed relative to the light guide plate.

19 Claims, 3 Drawing Sheets

LIQUID CRYSTAL DISPLAY WITH POINT ILLUMINATOR BONDED TO LIQUID CRYSTAL PANEL THEREOF

FIELD OF THE INVENTION

The present invention relates to a liquid crystal display (LCD) that includes a liquid crystal panel and a point illuminator bonded to the liquid crystal panel.

GENERAL BACKGROUND

Recently, liquid crystal displays that are light and thin and have low power consumption have been widely used in office automation equipment, video units, and the like.

Referring to FIG. 4, a typical liquid crystal display 3 includes a liquid crystal panel 320, a light guide plate (LGP) 340, a light emitting diode (LED) 330, and a flexible printed circuit (FPC) 310. The LGP 340 is disposed adjacent to a lower substrate 324 of the liquid crystal panel 320. The LED 330 is bonded to the FPC 310, and is disposed adjacent to the LGP 340 for providing light beams to the LGP 340.

When the liquid crystal display 3 is subjected to vibration or shock during operation or transportation, the LED 330 is liable to move relative to the LGP 340 because of flexibility of the FPC 310. That is, a distance between the LED 330 and the LGP 340 may be unsteady, and a position of the LED 330 relative to a vertical central axis (not shown) of the LGP 340 may be unsteady. When either of the above-described events occurs, an optical performance of the liquid crystal display 3 may be seriously impaired as a result.

What is needed, therefore, is a liquid crystal display that can overcome the above-described deficiencies.

SUMMARY

In an exemplary embodiment, a liquid crystal display includes a liquid crystal panel, a light guide plate, and a point illuminator. The liquid crystal panel includes a first substrate, a second substrate, and a liquid crystal layer disposed between the first and second substrates. The light guide plate is disposed on a side of the second substrate that is not in contact with the liquid crystal layer, and includes a light incident surface. The point illuminator is bonded to the side of the second substrate that is not in contact with the liquid crystal layer, and faces the light incident surface of the light guide plate, such that the position of the point illuminator is fixed relative to the light guide plate.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe various embodiments of the present invention in detail.

Figure 1:
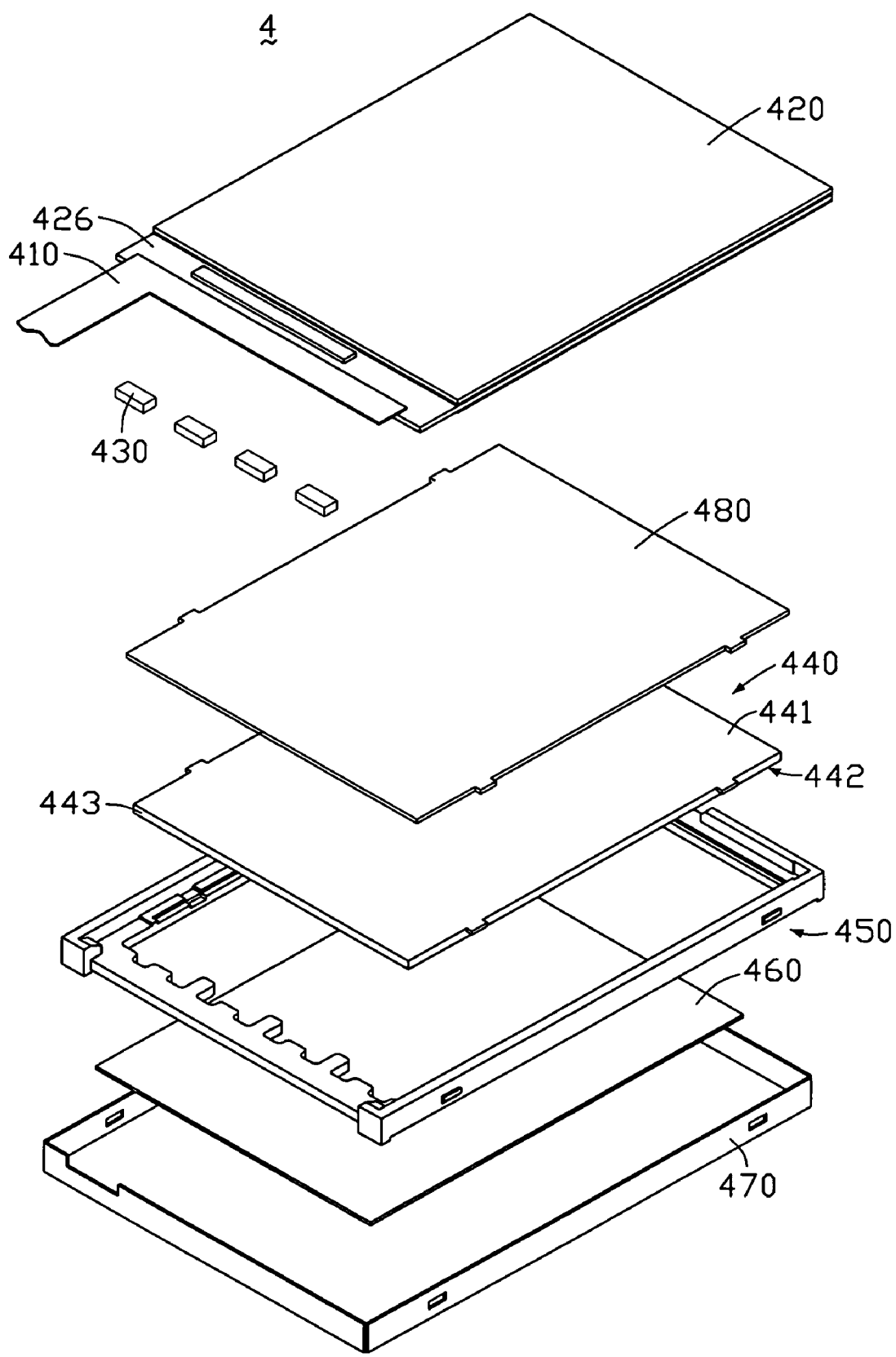
FIG. 1 is an exploded, isometric view of a liquid crystal display according to an exemplary embodiment of the present invention.

Referring to FIG. 1, a liquid crystal display 4 according to an exemplary embodiment of the present invention is shown. The liquid crystal display 4 includes a liquid crystal panel 420, an optical film 480, an LGP 440, a plastic frame 450, a reflective film 460, and a bottom tray 470, arranged in that order from top to bottom. The liquid crystal display 4 further includes an FPC 410 and a plurality of point illuminators 430.

Figure 2:
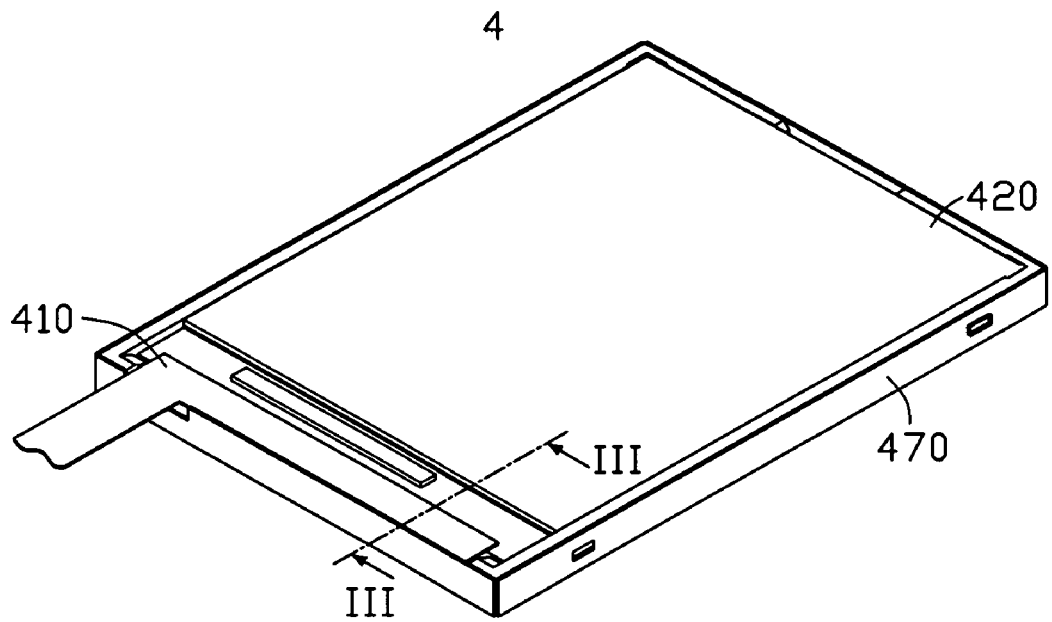
FIG. 2 is an assembled view of the liquid crystal display of FIG. 1.
Figure 3:
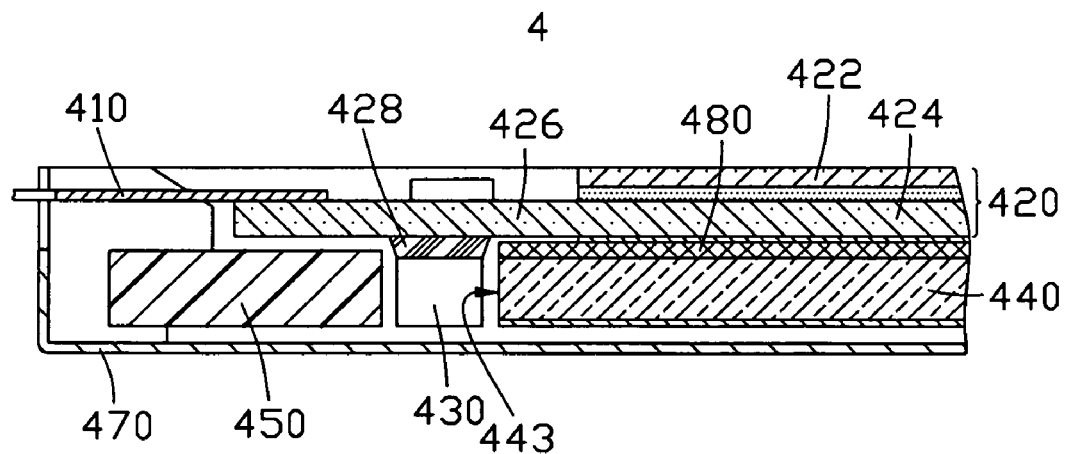
FIG. 3 is a side, cross-sectional view taken along line III-III of FIG. 2.
Figure 4:
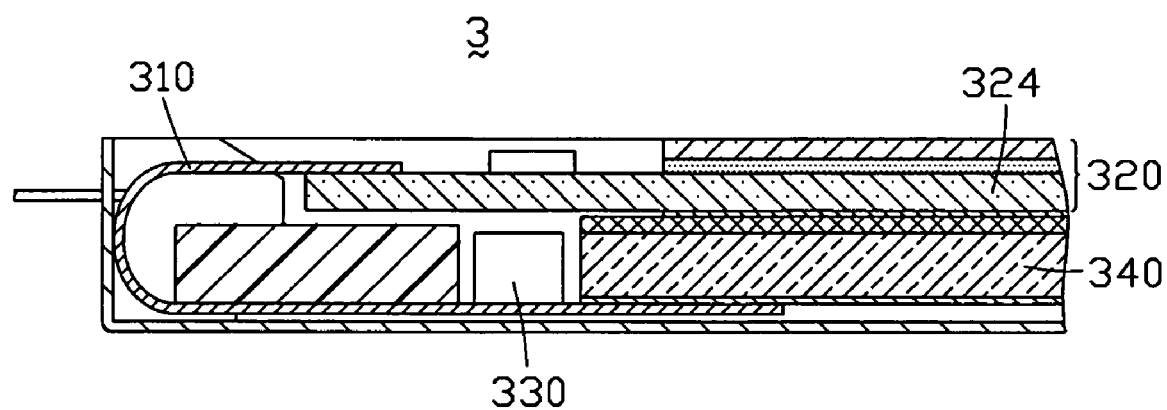
FIG. 4 is a side, cross-sectional view of a conventional liquid crystal display.

Referring also to FIG. 2 and FIG. 3, the liquid crystal panel 420 is substantially rectangular, and includes an upper substrate 422, a lower substrate 424, and a liquid crystal layer (not labeled). The upper substrate 422 and the lower substrate 424 are located at opposite sides of the liquid crystal panel 420, and the liquid crystal layer is sealed between the upper substrate 422 and the lower substrate 424. The lower substrate 424 includes an extension portion 426 at an edge thereof, and the extension portion 426 is exposed to the liquid crystal layer and the upper substrate 422.

The FPC 410 is bonded to a side of the lower substrate 424 that is in contact with the liquid crystal layer. A metal pad 428 is formed on the other side of the lower substrate 424 that is not in contact with the liquid crystal layer, and the metal pad 428 is electrically connected to an external control circuit (not shown). The point illuminators 430 are bonded to the metal pad 428 by an anisotropic conductive film (ACF, not shown) and electrically connected to the external control circuit. In the illustrated embodiment, the lower substrate 424 is rigid, and the point illuminators 430 are LEDs.

The LGP 440 is located below the lower substrate 424. The LGP 440 includes a top surface 441, a bottom surface 442, and a light incident surface 443. The top surface 441 and the bottom surface 442 are located on opposite sides of the LGP 440, and are perpendicular to the light incident surface 443. The light incident surface 443 faces the point illuminators 430. The LGP 440 and the point illuminators 430 cooperatively provide uniform light beams for the liquid crystal panel 420. The LGP 440 can for example be made from polycarbonate or polymethyl methacrylate (PMMA), and can be manufactured using an injection molding method. The optical film 480 is disposed between the lower substrate 424 of the liquid crystal panel 420 and the top surface 441 of the LGP 440. In the illustrated embodiment, a thickness of the conductive pad 428 matches a thickness of the optical film 480.

The plastic frame 450 has a substantially rectangular shape. The plastic frame 450 includes a plurality of side walls (not labeled) connected end to end, and an annular supporting board (not labeled) inwardly extending from inner surfaces (not labeled) of the side walls. The side walls and the supporting board cooperatively define a receiving space (not labeled) for receiving the LGP 440, the optical film 480, and the liquid crystal panel 420.

The bottom tray 470 includes a rectangular bottom plate (not labeled), and a plurality of side plates (not labeled) upwardly extending from edges of the bottom plate, respectively. The bottom tray 470 is configured to receiving the plastic frame 450 and the reflective film 460. The bottom tray 470 can be made from, for example, steel, iron, aluminum, magnesium, or any alloy including at least one of these metals.

In summary, the point illuminators 430 are integrally bonded to the rigid lower substrate 424 of the liquid crystal panel 420. That is, when the liquid crystal display 4 is assembled, the position of the point illuminators 430 are fixed relative to the LGP 440, even when the liquid crystal display 4 is subjected to vibration or shock during operation or transportation. Therefore, a distance between the point illuminators 430 and the LGP 440 and a position of the point illuminators 430 relative to a vertical central axis (not shown) of the LGP 440 can be reliably maintained. Thus, an optimized optical performance of the liquid crystal display 4 can be achieved and maintained. Further, the thickness of the conductive pad 428 matches the thickness of the optical film 480, and can be adjusted to compensate the existence of the optical film 480. Therefore, the point illuminators 430 can be aligned with the vertical central axis of the LGP 440 for improving a ratio of light utilization of the liquid crystal display 4.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
   a liquid crystal panel comprising a first substrate, a second substrate, and a liquid crystal layer disposed between the first and second substrates;
   a light guide plate disposed on a side of the second substrate that is not in contact with the liquid crystal layer, and comprising a light incident surface; and
   a point illuminator directly bonded to the side of the second substrate that is not in contact with the liquid crystal layer by an anisotropic conductive film (ACF), and facing the light incident surface of the light guide plate, such that the position of the point illuminator is fixed relative to the light guide plate.

2. The liquid crystal display of claim 1, wherein the second substrate comprises an extension portion arranged at an edge thereof, and the extension portion is not covered by the liquid crystal layer or the first substrate.

3. The liquid crystal display of claim 2, wherein the extension portion comprises a conductive pad formed on an outer surface thereof that is not in contact with the liquid crystal layer.

4. The liquid crystal display of claim 3, wherein the point illuminator is directly bonded to the conductive pad by the ACF.

5. The liquid crystal display of claim 3, further comprising an optical film disposed between the light guide plate and the liquid crystal panel wherein a thickness of the conductive pad matches a thickness of the optical film.

6. The liquid crystal display of claim 1, wherein the point illuminator is a light emitting diode (LED).

7. The liquid crystal display of claim 1, wherein the second substrate is rigid.

8. A liquid crystal display comprising:
   a liquid crystal panel comprising an upper substrate, a lower substrate, and a liquid crystal layer disposed between the upper and the lower substrates, the lower substrate including an extension portion at one edge thereof, the extension portion including a metal pad;
   a light guide plate disposed on a side of the lower substrate; and
   a point illuminator directly fixed to the metal pad and being adjacent to the light guide plate such that the position of the point illuminator is fixed relative to the light guide plate, wherein the point illuminator and the light guide plate cooperatively provide uniform light beams for the liquid crystal panel.

9. The liquid crystal display of claim 8, wherein the point illuminator is directly fixed to the metal pad by an anisotropic conductive film (ACF).

10. A liquid crystal display comprising:
    a point illuminator;
    a liquid crystal panel comprising a first substrate, a second substrate, and a liquid crystal layer disposed between the first and second substrates, the second substrate comprising an inner surface and an outer surface at opposite sides thereof, with the inner surface being adjacent and opposite to the first substrate; and
    a light guide plate adjacent to the outer surface of the second substrate;
    wherein the point illuminator is directly mounted on the second substrate and is adjacent to the light guide plate such that the position of the point illuminator is fixed relative to the light guide plate, and the point illuminator and the light guide plate cooperatively provide uniform light beams for the liquid crystal panel.

11. The liquid crystal display of claim 10, wherein the second substrate comprises an extension portion at an edge thereof, and the extension portion is exposed to the liquid crystal layer and the first substrate.

12. The liquid crystal display of claim 11, wherein the extension portion comprises a conductive pad formed on the outer surface.

13. The liquid crystal display of claim 12, wherein the point illuminator is directly mounted on the conductive pad.

14. The liquid crystal display of claim 13, wherein the point illuminator is directly mounted on the conductive pad by an anisotropic conductive film (ACF).

15. The liquid crystal display of claim 14, further comprising an optical film disposed between the light guide plate and the liquid crystal panel, wherein a thickness of the conductive pad matches a thickness of the optical film.

16. The liquid crystal display of claim 10, wherein the point illuminator is a light emitting diode (LED).

17. The liquid crystal display of claim 10, wherein the second substrate is rigid.

18. The liquid crystal display of claim 12, wherein the conductive pad is a metal pad.

19. The liquid crystal display of claim 10, wherein the light guide plate comprises a light incident surface, the point illuminator facing the light incident surface of the light guide plate.

* * * * *